US010243630B2

(12) United States Patent
Cariou et al.

(10) Patent No.: US 10,243,630 B2
(45) Date of Patent: Mar. 26, 2019

(54) APPARATUS, SYSTEM AND METHOD OF COMMUNICATING VIA A PLURALITY OF SECTORIZED ANTENNAS

(71) Applicant: INTEL IP CORPORATION, Santa Clara, CA (US)

(72) Inventors: Laurent Cariou, Portland, OR (US); Solomon B. Trainin, Haifa (IL); Chittabrata Ghosh, Fremont, CA (US); Ou Yang, Santa Clara, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/863,945

(22) Filed: Jan. 7, 2018

(65) Prior Publication Data

US 2018/0262239 A1  Sep. 13, 2018

Related U.S. Application Data

(63) Continuation of application No. 15/199,588, filed on Jun. 30, 2016, now Pat. No. 9,866,291.

(51) Int. Cl.
*H04B 7/0452* (2017.01)
*H04L 29/08* (2006.01)
(Continued)

(52) U.S. Cl.
CPC ......... *H04B 7/0452* (2013.01); *H04B 7/0897* (2013.01); *H04L 61/6022* (2013.01); *H04L 69/322* (2013.01)

(58) Field of Classification Search
CPC .. H04B 7/0617; H04B 7/0413; H04B 7/0408; H04B 7/04; H04B 7/0452; H04B 7/0491;
(Continued)

(56) References Cited

U.S. PATENT DOCUMENTS 9,332,571 B2 *  5/2016  Zhu ..................... H04B 7/0413
9,866,291 B1  1/2018  Cariou et al.
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
(Continued)

*Primary Examiner* — Rahel Guarino
(74) *Attorney, Agent, or Firm* — Schichrur & Co.

(57) ABSTRACT

For example, an apparatus may include a plurality of PHY components configured to communicate over a frequency band above 45 GHz via a plurality of sectorized antennas, the plurality of PHY components including at least a first PHY component to communicate via a first sectorized antenna and a second PRY component to communicate via a second sectorized antenna; a plurality of MAC components including at least a first MAC component and a second MAC component, the first MAC component configured to control channel access via the first sectorized antenna and to process MPDUs to be communicated via the first sectorized antenna, the second MAC component configured to control channel access via the second sectorized antenna and to process MPDUs to be communicated via the second sectorized antenna; and a MAC management component configured to manage communication via the plurality of sectorized antennas.

19 Claims, 6 Drawing Sheets

(51) Int. Cl.
*H04B 7/08* (2006.01)
*H04L 29/12* (2006.01)

(58) Field of Classification Search
CPC .............. H04B 2203/5441; H04B 7/26; H04B 7/2612; H04B 7/0897; H04B 2203/5408; H04B 7/024; H04B 7/026; H04W 84/12; H01Q 1/2291; H04L 69/08; H04L 69/323
See application file for complete search history.

(56) References Cited

U.S. PATENT DOCUMENTS

| | | | |
|---|---|---|---|
| 2015/0055526 A1 | 2/2015 | Shao et al. | |
| 2017/0064583 A1* | 3/2017 | Roy | H04W 36/0005 |
| 2017/0302349 A1* | 10/2017 | Sun | H04W 76/10 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Office Action for U.S. Appl. No. 15/199,588, dated Jun. 15, 2017, 10 pages.

Notice of Allowance for U.S. Appl. No. 15/199,588, dated Sep. 1, 2017, 10 Pages.

* cited by examiner

US 10,243,630 B2

APPARATUS, SYSTEM AND METHOD OF COMMUNICATING VIA A PLURALITY OF SECTORIZED ANTENNAS

TECHNICAL FIELD

Embodiments described herein generally relate to communicating via a plurality of sectorized antennas.

BACKGROUND

A wireless communication network in a millimeter-wave band may provide high-speed data access for users of wireless communication devices.

Some Specifications may be configured to support a Multi User (MU) system, in which an Access Point (AP) simultaneously transmits frames to a plurality of stations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
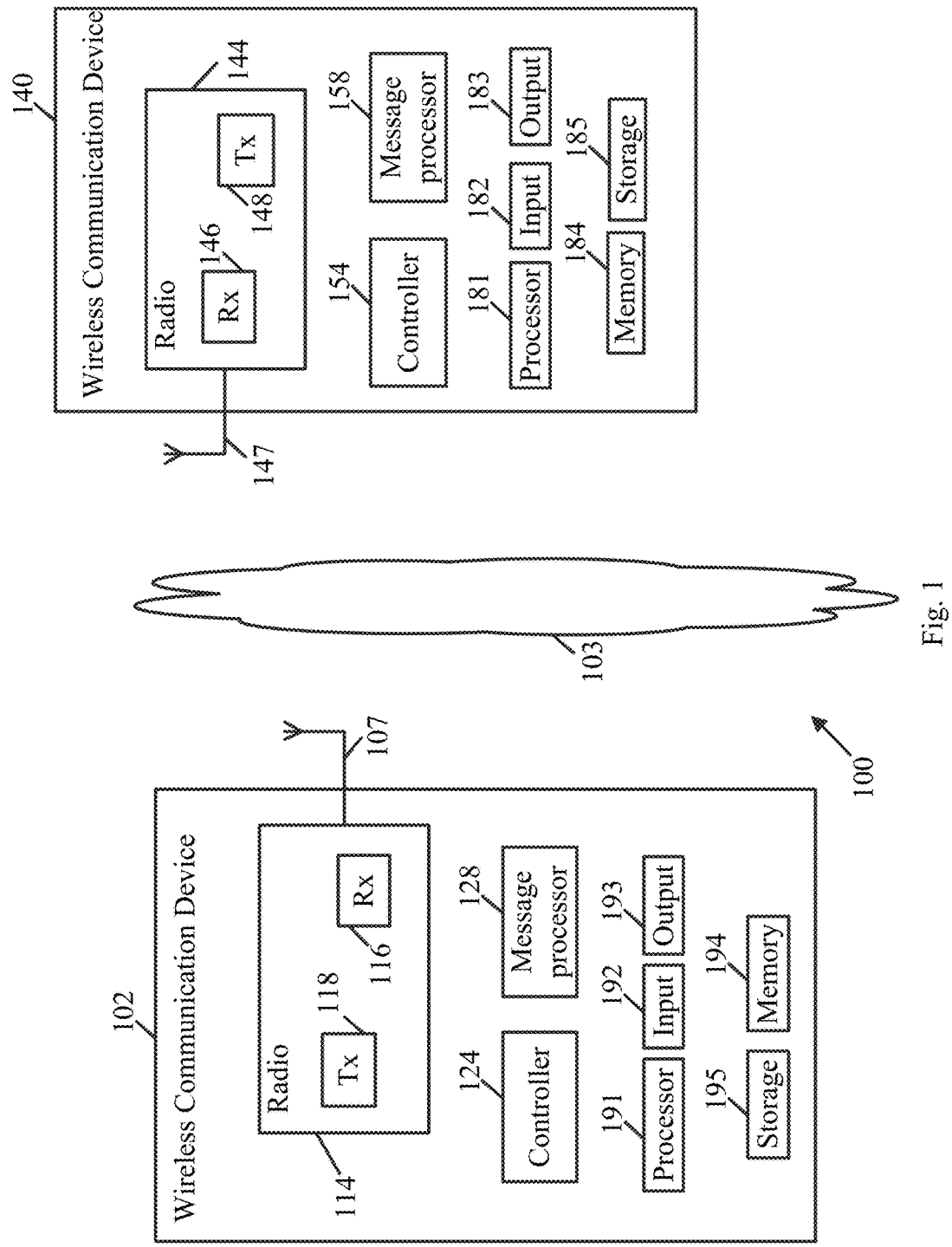
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE 802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band,*"28 Dec. 2012); IEEE-802.11REVmc ("*IEEE 802.11-REVmcTM/D3.0, June 2014 draft standard for Information technology—Telecommunications and information exchange between systems*

Local and metropolitan area networks Specific requirements; Part 11: Wireless LAN Medium Access Control (MAC) and Physical Layer (PHY) Specification"); IEEE 802.11ax (*IEEE 802.11ax, High Efficiency WLAN (HEW)*); IEEE 802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5, Aug. 4, 2014*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may operate as and/or perform one or more functionalities of any other wireless device and/or station, e.g., a WLAN STA, a WiFi STA, and the like.

In some demonstrative embodiments, device 102 and/or device 140 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments, WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some demonstrative embodiments may be implemented, for example, in accordance with a new standard in an mmWave band, e.g., a 60 GHz frequency band or any other directional band, for example, as an evolution of an *IEEE 802.11ad standard*.

In some demonstrative embodiments, devices 102 and/or 140 may be configured according to one or more standards, for example, in accordance with an *IEEE 802.11ay Standard*, which may be, for example, configured to enhance the efficiency and/or performance of an *IEEE 802.11ad Specification*, which may be configured to provide Wi-Fi connectivity in a 60 GHz band.

Some demonstrative embodiments may enable, for example, to significantly increase data transmission rates defined in the *IEEE 802.11ad specification*, which may, for example, satisfy growing demand in network capacity for new coming applications.

Some communications over a wireless communication band, for example, a DMG band or any other band, may be performed over a single channel bandwidth (BW). For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an *IEEE 802.11ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an *IEEE 802.11ay Standard* and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, device 102 may perform the functionality of an AP STA, and/or device 140 may perform the functionality of a non-AP STA.

In some demonstrative embodiments, MU-MIMO communication performed by an AP STA, which may simultaneously transmit to multiple STAs, for example, during a frame that starts and ends at the same time.

In some demonstrative embodiments, a directionality of communications over a directional frequency band may be an important factor, which may enable for example, to implement unsynchronized MU-MIMO communications, for example, to enable a transmission, e.g., each transmission, from an antenna of an AP STA to a non-AP STA to be performed independently from another transmission from another antenna of the AP STA to another non-AP STA, e.g., as described below.

In some demonstrative embodiments, devices 102 and/or 140 may be configured to perform MU-MIMO communication, in which a station, e.g., device 102, may independently transmit to each STA of a plurality of stations, for example, including device 140, e.g., as described below.

In some demonstrative embodiments, a wireless device, e.g., device 102, may be configured to implement a plurality of independent antennas, for example, while enabling improvements for handovers between the plurality of independent antennas, e.g., as described below.

In some demonstrative embodiments, a wireless device, e.g., device 102, may be configured to implement a plurality of independent antennas, while enabling improvements for interference coordination between the plurality of independent antennas, e.g., as described below.

In some demonstrative embodiments, devices 102 and/or 140 may be configured to perform MU-MIMO communication, in which a first transmission from a first antenna of a first STA, e.g., a STA implemented by device 102, to a second STA, e.g., a STA implemented by device 140, over a first wireless link, may be independent from a second transmission from a second antenna of the first STA, e.g., a second antenna of device 102, to a third STA over a second wireless link, e.g., as described below.

In some demonstrative embodiments, a wireless device, e.g., device 102, may be configured to operate as, perform the role of, and/or perform one or more functionalities of a multi-sectorized antenna AP STA, which may include a plurality of sectorized antennas, e.g., as described below.

In some demonstrative embodiments, a wireless device, e.g., device 102, may be configured to operate as, perform the role of, and/or perform one or more functionalities of a multi-sectorized antenna AP STA, which may be configured to perform unsynchronized MU-MIMO communication via the plurality of sectorized antennas, e.g., as described below.

In some demonstrative embodiments, the multi-sectorized antenna AP STA, e.g., device 102, may be configured to perform one or more signaling operations and/or communications, for example, to support communication via the plurality of sectorized antennas, e.g., as described below.

In some demonstrative embodiments, the plurality of sectorized antennas may be complementary, for example to enable quasi-omni coverage, e.g., as described below.

In some demonstrative embodiments, two or more sectorized antennas may have at least partially overlapping coverage.

In some demonstrative embodiments, two or more sectorized antennas may have non-overlapping coverage.

In some demonstrative embodiments, a multi-sectorized antenna STA, e.g., a multi-sectorized antenna AP STA, may include a plurality of sectorized antennas having different, non-overlapping coverage.

In some demonstrative embodiments, a multi-sectorized antenna STA, e.g., a multi-sectorized antenna AP STA, may include a plurality of sectorized antennas, of which some antenna sectors may have non-overlapping coverage, while other antenna sectors may have overlapping coverage.

In some demonstrative embodiments, the plurality of sectorized antennas may be configured to have different coverage, for example, to enable at least to reduce interference between the sectorized antennas, e.g., as described below.

In some demonstrative embodiments, a sectorized antenna of the plurality of sectorized antennas, e.g., each sectorized antenna, may be associated with a baseband (BB) processing, and a Media Access Control (MAC) Enhanced Distributed Channel Access Function (EDCAF), e.g., as described below.

In some demonstrative embodiments, a sectorized antenna of the plurality of sectorized antennas, e.g., each sectorized antenna, may be fully independent from other sectorized antennas of the plurality of sectorized antennas, e.g., as described below.

In one example, the sectorized antenna may be configured to transmit or receive, for example, even without requiring any time synchronization with other sectorized antennas of the plurality of sectorized antennas. For example, a first sectorized antenna of the plurality of sectorized antennas may be able to transmit a transmission, while a second sectorized antenna of the plurality of sectorized antennas may receive a transmission.

In some demonstrative embodiments, two or more sectorized antennas of the plurality of antennas may be operated at a synchronized manner. For example, the two sectorized antennas may be operated to transmit simultaneously, an/or the two sectorized antennas may be operated to receive simultaneously.

In some demonstrative embodiments, a multi-sectorized antenna STA, e.g., a multi-sectorized antenna AP STA, for example, device 102, may include a common or shared MAC module, which may be configured to commonly control the plurality of sectorized antennas, e.g., as described below.

In some demonstrative embodiments, the common MAC may be configured to perform coordination between the plurality of sectorized antennas, to perform interference mitigation between the plurality of sectorized antennas, and/or to handle association with one or more STAs, and/or to perform one or more additional or alternative upper-MAC operations and/or functionalities, e.g., as described below.

In some demonstrative embodiments, a multi-sectorized antenna STA, e.g., a multi-sectorized antenna AP STA, for example, device 102, may implement an architecture, which may be configured to support and/or enable operation of the plurality of sectorized antennas, e.g., as described below.

Figure 2:
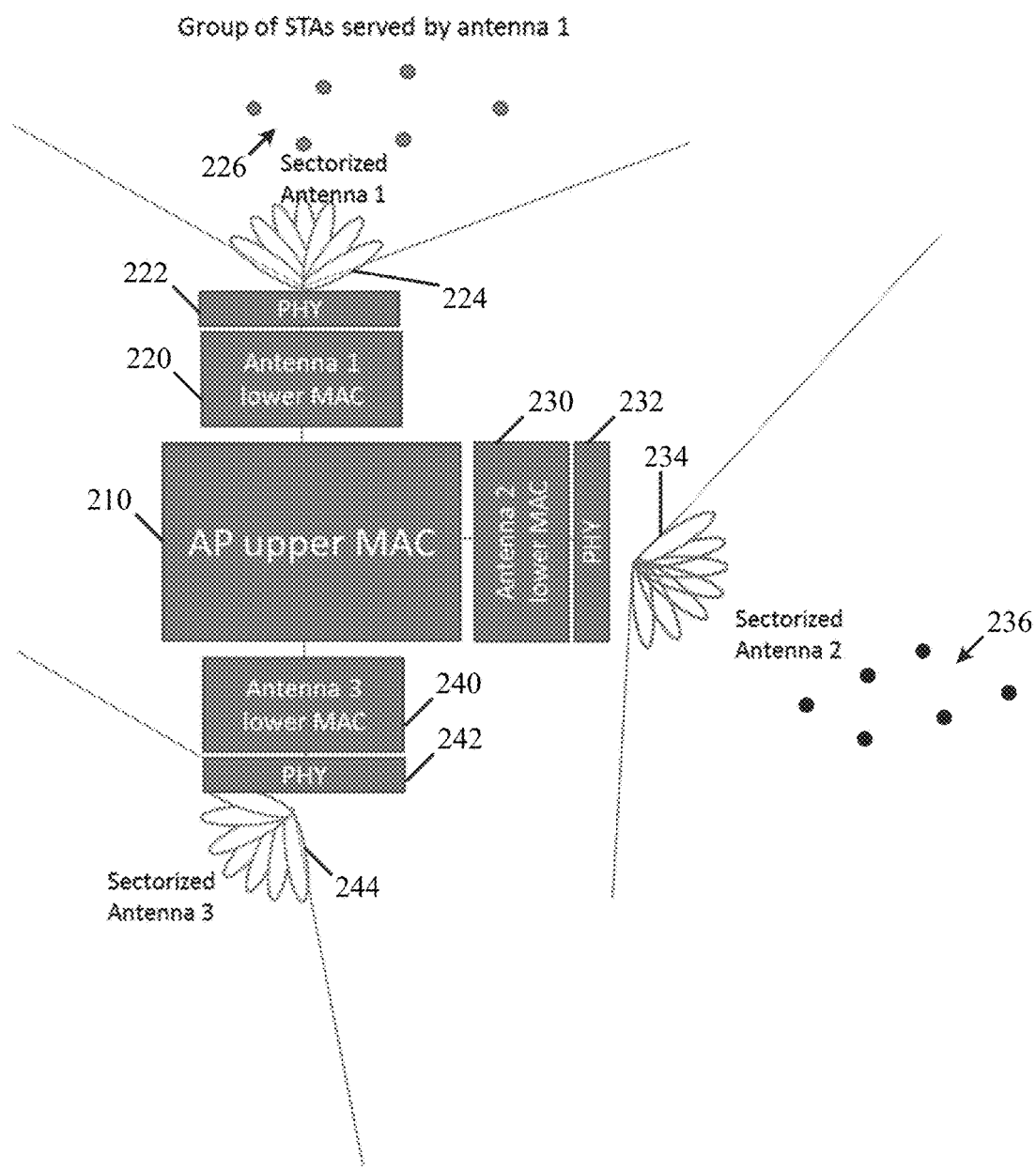
FIG. 2 is a schematic illustration of an architecture of a wireless station having a plurality of sectorized antennas, in accordance with some demonstrative embodiments.

Reference is made to FIG. 2, which schematically illustrates an architecture of a wireless station 200 having a plurality of sectorized antennas, in accordance with some demonstrative embodiments.

In some demonstrative embodiments, a wireless STA, for example, an AP STA, e.g., device 102 (FIG. 1), may implement wireless station 200, for example, to support and/or enable one or more operations of a plurality of sectorized antennas, e.g., as described below.

In some demonstrative embodiments, as shown in FIG. 2, wireless station 200 may include an upper MAC component 210.

In some demonstrative embodiments, upper MAC component 210 may include, and/or may be implemented, for example, by an upper MAC controller. In one example, controller 124 (FIG. 1) and/or message processor 128 (FIG. 1) may include, perform the role of, perform one or more operations of, and/or perform one or more functionalities of upper MAC component 210.

In some demonstrative embodiments, upper MAC component 210 may be unique for an AP STA, e.g., the AP STA may include one upper MAC component. In other embodiments, one or more functionalities of upper AMC component 210 may be distributed between two or more upper MAC components of the wireless station 200.

In some demonstrative embodiments, upper MAC component 210 may be configured to present a single MAC Service Access Point (SAP) to upper layers of the wireless station 200.

In some demonstrative embodiments, as shown in FIG. 2, wireless station 200 may include a plurality of lower MAC components, e.g., lower MAC components 220, 230 and 240.

In some demonstrative embodiments, as shown in FIG. 2, wireless station 200 may include a plurality of Physical layer (PHY) components, e.g., PHY components 222, 232 and 242.

In some demonstrative embodiments, as shown in FIG. 2, wireless station 200 may include a plurality of sectorized antennas, e.g., sectorized antennas 224, 234 and 244.

In some demonstrative embodiments, as shown in FIG. 2, the plurality of sectorized antennas may be associated with respective ones of the plurality of lower MAC components, and/or with respective ones of the PHY components.

In one example, as shown in FIG. 2, sectorized antenna 224 may be associated with PHY component 222 and lower MAC component 220; sectorized antenna 234 may be associated with PHY component 232 and lower MAC component 230; and/or sectorized antenna 244 may be associated with PHY component 242 and lower MAC component 240.

In some demonstrative embodiments, the plurality of lower MAC components may include, and/or may be implemented, for example, by a respective plurality of lower MAC controllers. In one example, controller 124 (FIG. 1) and/or message processor 128 (FIG. 1) may include, perform the role of, perform one or more operations of, and/or perform one or more functionalities of the plurality of lower MAC components.

In some demonstrative embodiments, the plurality of PHY components may include, and/or may be implemented, for example, by a respective plurality of PHY controllers. In one example, controller 124 (FIG. 1) and/or message processor 128 (FIG. 1) may include, perform the role of, perform one or more operations of, and/or perform one or more functionalities of the plurality of PHY components.

In some demonstrative embodiments, the plurality of sectorized antennas may include, and/or may be implemented by, for example, antennas 107 (FIG. 1).

In some demonstrative embodiments, the plurality of PHY components may include circuitry and/or logic configured to communicate via the respective plurality of sectorized antennas over a directional frequency band. For example, PHY component 222 may be configured to communicate via sectorized antenna 224, PHY component 232 may be configured to communicate via sectorized antenna 234, and/or PHY component 242 may be configured to communicate via sectorized antenna 244.

In some demonstrative embodiments, a lower MAC component of the plurality of lower MAC components may be configured to control channel access of the wireless station 200 via a respective sectorized antenna of the plurality of sectorized antennas.

In one example, a lower MAC component of the plurality of lower MAC components may be configured to manage and/or control, for example, at least a clear channel assessment (CCA), and/or an EDCAF over a channel via the sectorized antenna associated with the lower MAC component.

In some demonstrative embodiments, a lower MAC component of the plurality of lower MAC components may be configured to process MAC Protocol Data Units (PDUs) to be communicated via the sectorized antenna associated with the lower MAC component.

In some demonstrative embodiments, a lower MAC component of the plurality of lower MAC components may be configured to generate the MAC PDUs to be transmitted via the sectorized antenna associated with the lower MAC component.

In some demonstrative embodiments, the lower MAC component of the plurality of lower MAC components may be configured to process received MAC PDUs, and/or to manage retransmissions of the received MAC PDUs, e.g., via the sectorized antenna associated with the lower MAC component.

For example, lower MAC component 220 may be configured to control channel access of wireless station 200 via sectorized antenna 224 and/or to generate and/or process MAC PDUs to be communicated via sectorized antenna 224; lower MAC component 230 may be configured to control channel access of wireless station 200 via sectorized antenna 234 and/or to generate and/or process MAC PDUs to be communicated via sectorized antenna 234; and/or lower MAC component 240 may be configured to control channel access of wireless station 200 via sectorized antenna 244 and/or to generate and/or process MAC PDUs to be communicated via sectorized antenna 244.

In some demonstrative embodiments, as shown in FIG. 2, upper MAC component 210 may be connected to, coupled to, associated with and/or configured to manage and/or control one or more operations of the plurality of lower MAC components 220, 230 and/or 240.

In some demonstrative embodiments, upper MAC component 210 may be configured to coordinate unsynchronized communication via the plurality of sectorized antennas 224, 234, and/or 244, e.g., as described below.

In some demonstrative embodiments, upper MAC component 210 may be configured to coordinate the unsynchronized communication, for example, by coordinating, triggering, controlling and/or managing, transmission via at least one first sectorized antenna, for example, simultaneously with reception via at least one second sectorized antenna. For example, upper MAC component 210 may be configured to coordinate transmission via sectorized antenna 224 simultaneously with reception via sectorized antenna 244.

In some demonstrative embodiments, upper MAC component 210 may be configured to coordinate the unsynchronized communication, for example, by coordinating, triggering, controlling and/or managing a MU communication including transmission to at least one first user STA via the at least one first sectorized antenna, and reception from at least one second user STA via the at least one second sectorized antenna. For example, upper MAC component 210 may be configured to coordinate transmission via sectorized antenna 224 to one or more users 226, and reception from one or more users 236 via sectorized antenna 234, e.g., during one or more non overlapping, partially overlapping, and/or fully overlapping time periods.

In some demonstrative embodiments, upper MAC component 210 may be configured to coordinate the unsynchronized communication, for example, by coordinating, triggering, controlling and/or managing a MU-MIMO communication including, for example, beamformed transmission to the at least one first user STA via at least one first sectorized antenna, and beamformed reception from at least one second user STA via at least one second sectorized antenna. For example, upper MAC component 210 may be configured to coordinate beamformed transmission via sectorized antenna 224 to one or more users 226, and beamformed reception from one or more users 236 via sectorized antenna 234, e.g., during one or more non overlapping, partially overlapping, and/or fully overlapping time periods.

In some demonstrative embodiments, upper MAC component 210 may be configured to manage association between wireless STA 200, e.g., an AP STA, and one or more other wireless stations, e.g., one or more user STAs 226 and/or 236.

In some demonstrative embodiments, upper MAC component 210 may be configured to manage security of communication via the plurality of sectorized antennas, e.g., with user STAs 226 and/or 236.

In some demonstrative embodiments, upper MAC component 210 may be configured to manage interference coordination and/or mitigation between the plurality of sectorized antennas of wireless station 200, e.g., as described below.

In some demonstrative embodiments, upper MAC component 210 may be configured to indicate a sectorized antenna of the plurality of sectorized antennas, a respective lower MAC component of the plurality of lower MAC components, and/or a respective PHY component of the plurality of PHY components, which may be used for a communication between wireless station 200 and one or more user STAs, e.g., as described below.

In some demonstrative embodiments, upper MAC component 210 may be configured to cause, trigger and/or control wireless station 200, e.g., an AP STA, to transmit an information element (IE) via at least one sectorized antenna of the plurality of sectorized antennas. For example, upper MAC component 210 may cause trigger and/or control wireless station 200 to transmit the IE via sectorized antenna 224.

In some demonstrative embodiments, the information element (also referred to as the sectorized antenna IE") may include at least a MAC address of the wireless station 200, e.g., a MAC address of the AP STA, and a field to indicate a plurality of identifiers (IDs) of the plurality of sectorized antennas implemented by wireless station 200, e.g., as described below.

In some demonstrative embodiments, upper MAC component 210 may be configured to cause, trigger and/or control wireless station 200, e.g., an AP STA, to transmit the sectorized antenna information element in one or more pre-association frames, e.g., as described below.

In some demonstrative embodiments, upper MAC component 210 may be configured to cause, trigger and/or control wireless station 200, e.g., an AP STA, to transmit the sectorized antenna information element in a beacon frame.

In some demonstrative embodiments, upper MAC component 210 may be configured to cause, trigger and/or control wireless station 200, e.g., an AP STA, to transmit the sectorized antenna information element in one or more post-association frames.

In some demonstrative embodiments, upper MAC component 210 may be configured to cause, trigger and/or control wireless station 200, e.g., an AP STA, to transmit the sectorized antenna information element in a beamforming training frame.

For example, upper MAC component 210 may be configured to cause, trigger and/or control wireless station 200, e.g., an AP STA, to transmit the sectorized antenna information element in one or more Sector Sweep (SSW) frames, and/or one or more Beam Refinement Protocol (BRP) frames.

In some demonstrative embodiments, upper MAC component 210 may be configured to cause, trigger and/or control wireless station 200, e.g., an AP STA, to transmit the sectorized antenna information element in one or more additional or alternative types of frames.

In some demonstrative embodiments, the sectorized antenna information element may include an indication of at least one sectorized antenna capability supported by the wireless station 200, e.g., the AP STA.

In some demonstrative embodiments, the at least one sectorized antenna capability may include, for example, a capability of fast transition between sectorized antennas, e.g., to switch between sectorized antennas of wireless station 200.

In some demonstrative embodiments, the at least one sectorized antenna capability may include, for example, a capability of interference coordination and/or mitigation between sectorized antennas of wireless station 200.

In some demonstrative embodiments, the at least one sectorized antenna capability may include, for example, a capability of multi-sectorized-antenna communication, e.g., connection, transmission and/or reception via the plurality of sectorized antennas of wireless station 200.

In some demonstrative embodiments, the sectorized antenna IE may include a field including a plurality of ID values corresponding to the plurality of IDs of the plurality of sectorized antennas of wireless station 200.

In some demonstrative embodiments, the sectorized antenna IE may include a field including a total number of the plurality of sectorized antennas implemented by wireless station 200. For example, the plurality of IDs of the plurality of sectorized antennas of wireless station 200 may be determined, e.g., inexplicitly, for example, based on the number of the plurality of sectorized antennas implemented by wireless station 200. For example, the plurality of sectorized antennas of wireless station 200 may be assigned with IDs, for example, according to order, e.g., from 1 to the total number of the plurality of sectorized antennas implemented by wireless station 200.

In some demonstrative embodiments, wireless station 200, e.g., the AP STA, may be configured to operate at one or more modes of operation, e.g., including at least a first mode of operation, and/or a second mode of operation. In some demonstrative embodiments, wireless station 200 may be configured to operate at only one of the first and second modes of operation, at more than the first and second modes of operation, e.g., three modes of operations, and/or at one or more additional or alternative modes of operation.

In some demonstrative embodiments, wireless station 200, e.g., the AP STA, may be configured to operate at a mode of operation ("the first mode of operation"), at which wireless station 200 may maintain a single MAC address, for example, even without including any further identification information in one or more frames communicated by wireless station 200, e.g., except for the information in the sectorized antenna information element, e.g., as described below.

In some demonstrative embodiments, an AP STA, e.g., wireless station 200, may be configured to send a plurality of beacons including the sectorized antenna information element, for example, via a plurality of different sectorized antennas, e.g., at different instants, for example, in an unsynchronized manner.

In some demonstrative embodiments, the AP STA, e.g., wireless station 200, may be configured to selectively switch between synchronized and unsynchronized communication via the plurality of sectorized antennas, for example, according to a time-domain scheme. For example, the AP STA may be configured to operate the plurality of sectorized antennas at a synchronized mode, e.g., such that communication via all of the sectorized antennas is synchronized, for example, during one or more first time-domain phases; and/or to operate the plurality of sectorized antennas at an unsynchronized mode, e.g., such that communication via some or all of the sectorized antennas is not synchronized, for example, during one or more second time-domain phases.

In some demonstrative embodiments, upper MAC component 210 may be configured to cause the AP STA to indicate, e.g., in one or more of the beacon frames, the timing and/or duration of the first and/or second time-domain phases.

In some demonstrative embodiments, the AP STA, e.g., wireless station 200, may be configured to serve one or more wireless stations, which may be associated with the AP STA, via a single sectorized antenna of the AP STA and/or via multiple sectorized antennas of the AP STA.

In one example, the AP STA, e.g., wireless station 200, may be configured to serve a first wireless station, which may be associated with the AP STA, via a single sectorized antenna of the AP STA, and/or to serve a second wireless station, which may be associated with the AP STA, via multiple sectorized antenna of the AP STA.

In another example, the AP STA, e.g., wireless station 200, may be configured to serve all wireless stations, which may be associated with the AP STA, via a single sectorized antenna of the AP STA.

In another example, the AP STA, e.g., wireless station 200, may be configured to serve all wireless stations, which may be associated with the AP STA, via multiple sectorized antenna of the AP STA.

In some demonstrative embodiments, the combination of the MAC addresses and the sector ID information, e.g., which may be included in the sectorized antenna IE, may be sufficient, for example, to identify the AP STA to one or more wireless stations.

In some demonstrative embodiments, an AP STA, e.g., wireless station 200, may be configured to operate at a second mode of operation, e.g., as described below.

In some demonstrative embodiments, the AP STA, e.g., wireless station 200, may include an ID of a sectorized antenna ("the sectorized antenna ID") in pre-association exchanges, e.g., beacon frames, and in frame exchanges, e.g., during beamforming, as described below.

In some demonstrative embodiments, there may be at least two options to enable the AP STA to include the sectorized antenna ID in one of more frames, for example, in pre-association and/or post-association frames, e.g., as described below. In other embodiments, any other mechanism may be implemented to allow the AP STA to signal the sectorized antenna ID in one or more frames.

In some demonstrative embodiments, according to a first implementation option, the AP STA, e.g., wireless station 200, may be configured to include the sectorized antenna ID in a MAC header of one or more frames, for example, in pre-association and/or post-association frames, e.g., as described below.

In some demonstrative embodiments, the AP STA, e.g., wireless station 200, may be configured to generate, set and/or encode a MAC header to be included in a header of a frame, for example, by modifying a MAC address field, which may be included in the MAC header of the frame, for example, according to a parsing function, e.g., such that the MAC header may encode both the MAC address of the AP STA and the sectorized antenna ID.

In one example, the last three Least Significant Bits (LSB) of the MAC address may be configured to encode the sectorized antenna ID, while the other bits of the MAC address may be utilized to encode the MAC address of the AP STA.

In some demonstrative embodiments, upper MAC component 210 may be configured to cause the AP STA to transmit a frame including a MAC header including a MAC address field.

In some demonstrative embodiments, upper MAC component 210 may be configured to cause the AP STA to configure the MAC address field to include a combination of the MAC address of the AP and an ID of the sectorized antenna, which may be used by the AP STA to transmit the frame.

In some demonstrative embodiments, according to a second implementation option, the AP STA, e.g., wireless station 200, may be configured to utilize a field, e.g., a new of dedicated field, to signal a sector ID of a sectorized antenna to transmit a frame, e.g., a pr-association or post-association frame, for example, while the MAC header of the frame may include the MAC address of the AP STA, e.g., without modification.

In some demonstrative embodiments, an antenna ID field may be included in the MAC header, e.g., in addition to the MAC address field, of one or more frames, e.g., pre-association and/or the post-association frames, communicated by the AP STA.

In other embodiments, the antenna ID field may be included in a PHY header of one or more frames, e.g., pre-association and/or the post-association frames, communicated by the AP STA.

In some demonstrative embodiments, the AP STA, e.g., wireless station 200, may be configured to include in a frame the antenna ID field including the indication the sectorized antenna ID to transmit the frame, for example, in all transmissions from the AP STA, for example, to enable wireless stations to be associated to the AP STA and to communicate with the AP STA, e.g., only via a specific sectored antenna, which may be indicated in the antenna ID field.

In some demonstrative embodiments, upper MAC component 210 may be configured to cause the AP STA to transmit a frame including a MAC header including a MAC address field.

In some demonstrative embodiments, the MAC address field may include the MAC address of the AP STA.

In some demonstrative embodiments, upper MAC component 210 may be configured to cause the AP STA to configure the frame to include an antenna ID field including an ID of a sectorized antenna to transmit the frame, e.g., the sectorized antenna ID.

In some demonstrative embodiments, a wireless station, e.g., a wireless station 226, may receive the sectorized antenna information element from wireless station 200. For example, device 140 (FIG. 1) may operate as, perform a role of, and/or perform one or more functionalities of, wireless station 226.

In some demonstrative embodiments, wireless station 226 may be configured to process the information element from the AP STA.

In some demonstrative embodiments, wireless station 226 may include a controller, e.g., a MAC controller, an upper or lower MAC controller, and/or a PHY controller, to process the information element from the AP. In one example, controller 154 (FIG. 1) may be configured to operate as, and/or perform one or more functionalities of, the MAC controller, the upper MAC controller, the lower MAC controller, and/or the PHY controller of wireless station 226.

In some demonstrative embodiments, the sectorized antenna information element from the AP STA may include at least the MAC address of the AP STA, a field to indicate the plurality of IDs of the plurality of sectorized antennas of the AP STA, and an indication of at least one sectorized antenna capability supported by the AP STA, e.g., as described above.

In some demonstrative embodiments, the field indicating the plurality of IDs of the plurality of sectorized antennas of the AP STA may include a total number of the plurality of sectorized antennas of the AP STA, e.g., as described above.

In some demonstrative embodiments, wireless station 226 may be configured to determine the plurality of IDs of the plurality of sectorized antennas of the AP STA, for example, based on the total number of the plurality of sectorized antennas. For example, wireless station 226 may be configured to determine the plurality of IDs of the plurality of sectorized antennas of the AP STA by assigning IDs, e.g., in increasing order beginning at 1 to the total number of indicated by the sectorized antenna IE.

In some demonstrative embodiments, wireless station 226 may be configured to communicate with at least one sectorized antenna of the AP STA, for example, according to the at least one sectorized antenna capability supported by the AP STA, e.g., as described below.

In some demonstrative embodiments, for example, if all sectorized antennas of the AP STA are operated in an unsynchronized monde, a wireless station, e.g., wireless station 226, which is to associate with the AP STA, may detect signals from a sectorized antenna of the AP STA, and may associate with the AP STA to communicate via the detected sectorized antenna of the AP STA.

In some demonstrative embodiments, the wireless station 226 may perform beamforming training with the AP STA, for example, with the detected sectorized antenna of the STA AP, for example, by including the sector ID of the detected sectorized antenna in beamforming frames to be transmitted to the AP STA.

In some demonstrative embodiments, the wireless station 226 may determine that the AP STA is a multi-sectorized APS STA including a plurality of sectorized antennas, for example, based on a sectorized antenna IE, which may be received from the AP STA.

In some demonstrative embodiments, wireless station 226 and may perform one or more operations, for example, based on the sectorized antenna capability supported by the AP STA, e.g., as indicated by the sectorized antenna IE.

In some demonstrative embodiments, the AP STA may operate in a synchronized mode, for example, during at least one or more, e.g., during some or all, service periods of one or more Beacon Intervals (BIs), e.g., every BI.

In some demonstrative embodiments, the wireless station 226 may associate with the AP STA via a sectorized antenna, e.g., even any sectorized antenna, of the plurality of sectorized antennas of the AP STA, for example, if the AP STA operates at the synchronized mode during the one or more service periods, e.g., of each BI.

In some demonstrative embodiments, the wireless station 226 may determine that the AP STA is a multi-sectorized APS STA including a plurality of sectorized antennas, for example, based on a sectorized antenna IE, which may be received from the AP STA.

In some demonstrative embodiments, wireless station 226 and may perform one or more operations, for example, based on the sectorized antenna capability supported by the AP STA, e.g., as indicated by the sectorized antenna IE.

In some demonstrative embodiments, wireless station 226 may process a frame, e.g., a pre-association frame or a post-association frame, including the indication of sector ID of the sectorized antenna of the AP STA, which is used to transmit the frame, e.g., as described above.

In some demonstrative embodiments, the frame may include a MAC header including a MAC address field, which may encode a combination of the MAC address of the AP STA and the sector ID, e.g., as described above.

In some demonstrative embodiments, the frame may include a MAC address field including the MAC address of the AP, and an antenna ID field to include the ID of the sectorized antenna, e.g., as described above.

In some demonstrative embodiments, wireless station 226 may transmit a beamforming training frame to perform beamforming training with the sectorized antenna of the AP, for example, based on the necrotized antenna ID in the frame detected from the AP STA.

In some demonstrative embodiments, the beamforming frame may include an ID of the sectorized antenna, e.g., the same antenna ID indicated by the frame from the AP STA.

In some demonstrative embodiments, the AP STA, e.g., wireless station 200, may receive the beamforming frame from the wireless station 226 and may perform one or more operations, e.g., as described below.

In some demonstrative embodiments, for example, the AP STA may request the wireless station to communicate only with a sectorized antenna of the plurality of sectorized antennas of the AP STA, e.g., during an unsynchronized MU-MIMO period. According to these embodiments, the wireless station may perform beamforming training with the sectorized antenna, e.g., as requested by the AP STA.

In some demonstrative embodiments, for example, if the beamforming training is initiated by the AP STA, the AP STA may proceed to perform beamforming training with the wireless station, for example, based on the beamforming frame received from the wireless station.

In some demonstrative embodiments, the beamforming training may be initiated by the wireless station, e.g., by sending one or more SSW and/or BRP frames to the AP STA.

In some demonstrative embodiments, the AP STA may be allowed to respond to the beamforming frames from the wireless station, for example, if the AP STA is capable of determining, e.g., for each sectorized antenna of the AP STA, from which wireless station with a frame is being received, e.g., based on a transmitter address indicated by the frame; and/or if the AP STA is capable of determining whether or not to respond to the wireless station. For example, the AP STA may be capable of selecting to respond to a beamforming frame received from a STA via a sectorized antenna, e.g., if the STA is part of one or more STAs that are to be served by the sectorized antenna of the AP STA, or selecting not to respond to the beamforming frame, for example, if the STA is not part of the one or more STAs that are served by the sectorized antenna of the AP STA.

In some demonstrative embodiments, wireless station 226, e.g., device 140 (FIG. 1), may be configured to generate and/or transmit to an AP STA, e.g., device 102 (FIG. 1), a beamforming frame to perform beamforming with a sectorized antenna of the AP STA.

In some demonstrative embodiments, wireless station 226, e.g., device 140 (FIG. 1), may be configured to generate and/or transmit the beamforming frame including an ID of the sectorized antenna of the AP STA, with which the beamforming training is to be performed.

In some demonstrative embodiments, the beamforming training frame may include a field including the sectorized antenna ID of the AP to receive the beamforming training frame.

In some demonstrative embodiments, including the ID of the sectorized antenna of the AP STA in the beamforming training frame from wireless station 226 may enable, for example, the AP STA, e.g., wireless station 200, to determine whether or not to respond to the beamforming frame, for example, even if the AP STA is not capable of identifying which sectorized antenna is to be used for beamforming with the STA from which the beamforming training frame is received.

In some demonstrative embodiments, including the ID of the sectorized antenna of the AP STA in the beamforming training frame from wireless station 226 may enable, for example, the AP STA, e.g., wireless station 200, to selectively respond to beamforming training frames, for example, to avoid a situation where the AP STA responds to each beamforming training frame received via any sectorized antenna, e.g., even if a STA transmitting the beamforming training frame is not to be served by the sectorized antenna receiving the beamforming training frame.

In some demonstrative embodiments, one or more reserved bits may be used to indicate the sectorized antenna ID of the AP STA, for example, if the beamforming training frame includes a BRP frame.

In some demonstrative embodiments, a control trailer at the end of the BRP frame may be used to indicate the sectorized antenna ID of the AP STA.

In some demonstrative embodiments, a control trailer at the end of an SSW frame may be used to indicate the sectorized antenna ID of the AP STA.

In some demonstrative embodiments, a modified, dedicated and/or new SSW frame format ("enhanced_SSW frame") may be defined, for example, to include a field configured to indicate the sectorized antenna ID of the AP STA.

In some demonstrative embodiments, upper MAC component 210 may be configured to cause the AP STA, e.g., wireless station 200, to selectively respond to a beamforming training frame, for example, based on a comparison between a first sectorized antenna ID indicated in the beamforming training frame, and a second sectorized ID of a sectorized antenna, via which the beamforming training frame is received.

For example, upper MAC component 210 may be configured to cause the AP STA to respond to the beamforming training frame, for example, only if the first sectorized antenna ID indicated in the beamforming training frame matches the second sectorized ID of the sectorized antenna, via which the beamforming training frame is received.

For example, upper MAC component 210 may be configured to cause the AP STA to select not to respond to the beamforming training frame, for example, if the first sectorized antenna ID indicated in the beamforming training frame does not match the second sectorized ID of the sectorized antenna, via which the beamforming training frame is received.

Figure 3:
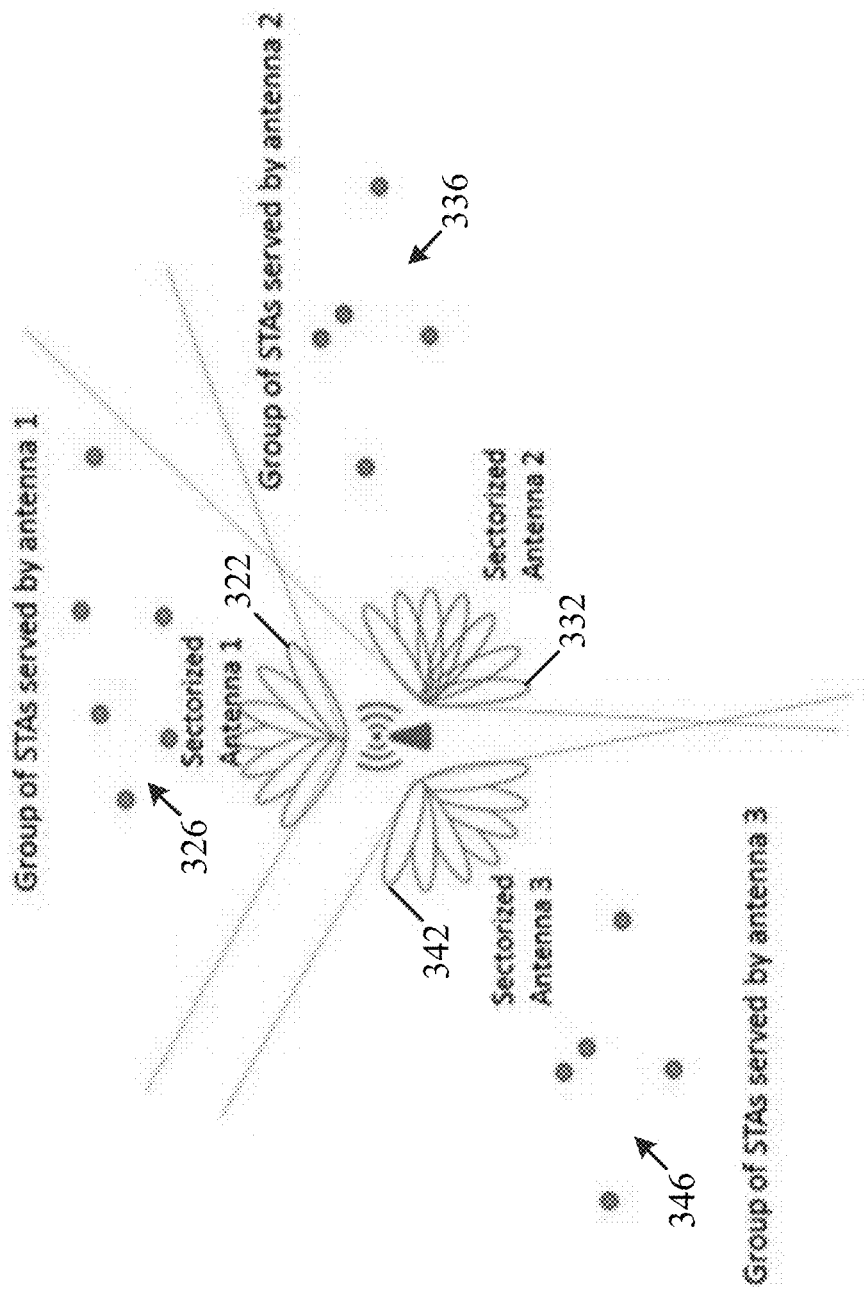
FIG. 3 is a schematic illustration of a coverage scheme of a plurality of sectorized antennas of an Access Point (AP), in accordance with some demonstrative embodiments.

Reference is made to FIG. 3, which schematically illustrates a coverage scheme 300 of a plurality of sectorized antennas of an AP 302, in accordance with some demonstrative embodiments. For example, AP 302 may include, operate as, and/or perform one or more functionalities of, wireless station 200 (FIG. 2). For example, device 102 (FIG. 1) may be configured to operate as, perform a role of, and/or perform one or more functionalities of, AP 302.

In some demonstrative embodiments, as shown in FIG. 3, the plurality of sectorized antennas of AP 302 may include a first sectorized antenna 322 to communicate with one or more users 326, a second sectorized antenna 332 to communicate with one or more users 336, and/or a third sectorized antenna 342 to communicate with one or more users 346.

In some demonstrative embodiments, as shown in FIG. 3, there may be an overlap between the coverage of sectorized antennas 322 and 332, and/or between sectorized antennas 332 and 342, for example, to enable handoff between sectorized antennas 322, 332, and/or 342.

Figure 4:
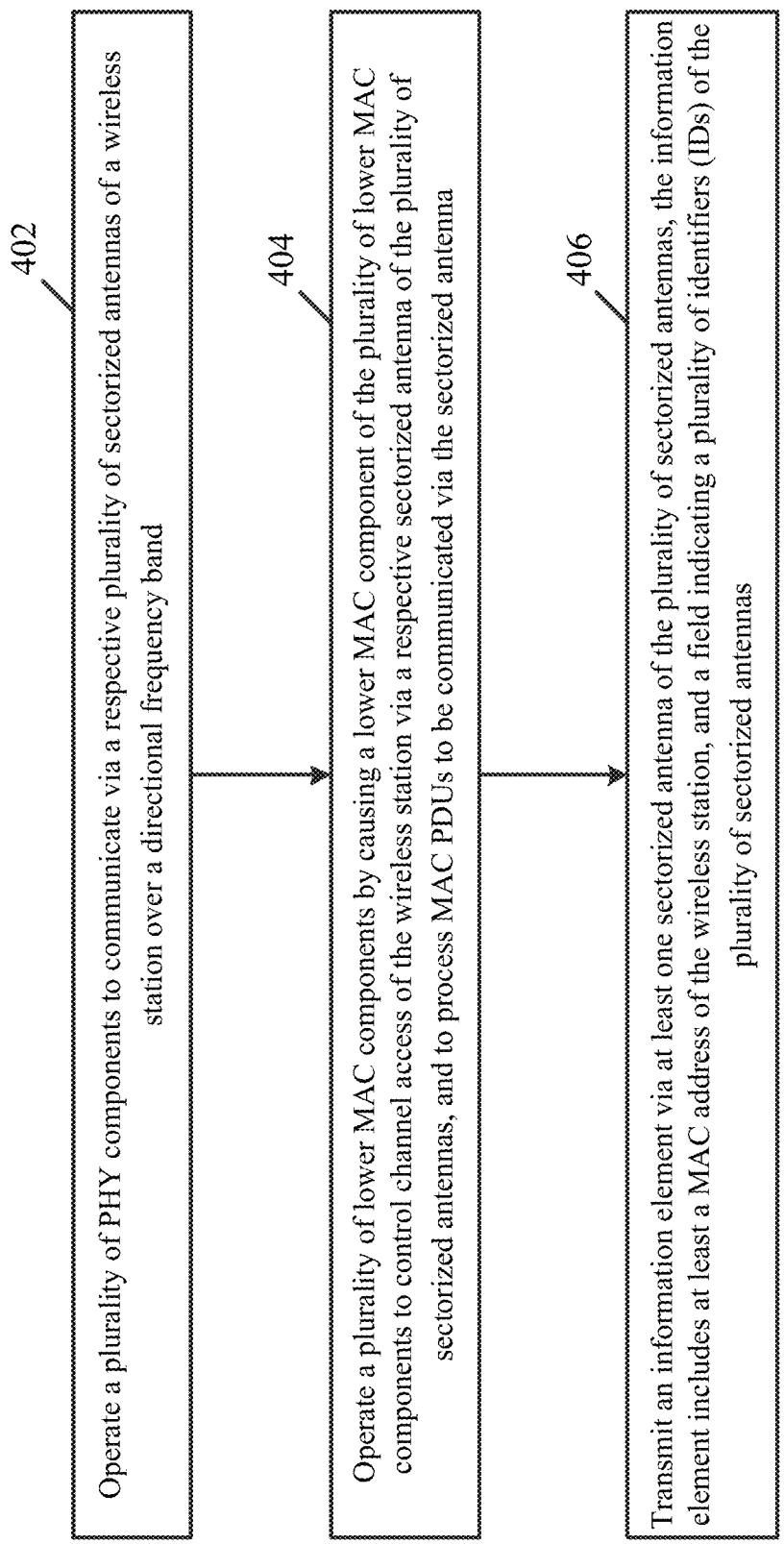
FIG. 4 is a schematic flow-chart illustration of a method of communicating via a plurality of sectorized antennas, in accordance with some demonstrative embodiments.

Reference is made to FIG. 4, which schematically illustrates a method of communicating via a plurality of sectorized antennas, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1); an upper MAC component, e.g., upper MAC component 210 (FIG. 2); a lower MAC component, e.g., lower MAC components 220, 230 and/or 240 (FIG. 2); and/or a lower PHY component, e.g., lower PHY components 222, 232 and/or 242 (FIG. 2).

As indicated at block 402, the method may include operating a plurality of PHY components to communicate via a respective plurality of sectorized antennas of a wireless station over a directional frequency band. For example, upper MAC component 210 (FIG. 2) may operate the plurality of PHY components 222, 232 and/or 242 (FIG. 2) to communicate via the respective plurality of sectorized antennas 224, 234, and/or 244 (FIG. 2) of the wireless station 200 (FIG. 2) over a directional frequency band, e.g., as described above.

As indicated at block 404, the method may include operating a plurality of lower MAC components by causing a lower MAC component of the plurality of lower MAC components to control channel access of the wireless station via a respective sectorized antenna of the plurality of sectorized antennas, and to process MAC PDUs to be communicated via the sectorized antenna. For example, lower MAC component 222 (FIG. 2) may control channel access of the wireless station 200 (FIG. 2) via sectorized antenna 224 (FIG. 2), and/or may process MAC PDUs to be communicated via sectorized antenna 224 (FIG. 2), e.g., as described above.

As indicated at block 406, the method may include transmitting an information element via at least one sectorized antenna of the plurality of sectorized antennas, the information element including at least a MAC address of the wireless station, and a field to indicate a plurality of identifiers (IDs) of the plurality of sectorized antennas. For example, MAC component 210 (FIG. 2) may cause wireless station 200 (FIG. 2) to transmit via at least one sectorized antenna of the plurality of sectorized antennas of wireless station (FIG. 2), a sectorized antenna information element including at least the MAC address of the wireless station 200 (FIG. 2), and a field to indicate the plurality of IDs of the plurality of sectorized antennas of wireless station 200 (FIG. 2), e.g., as described above.

Figure 5:
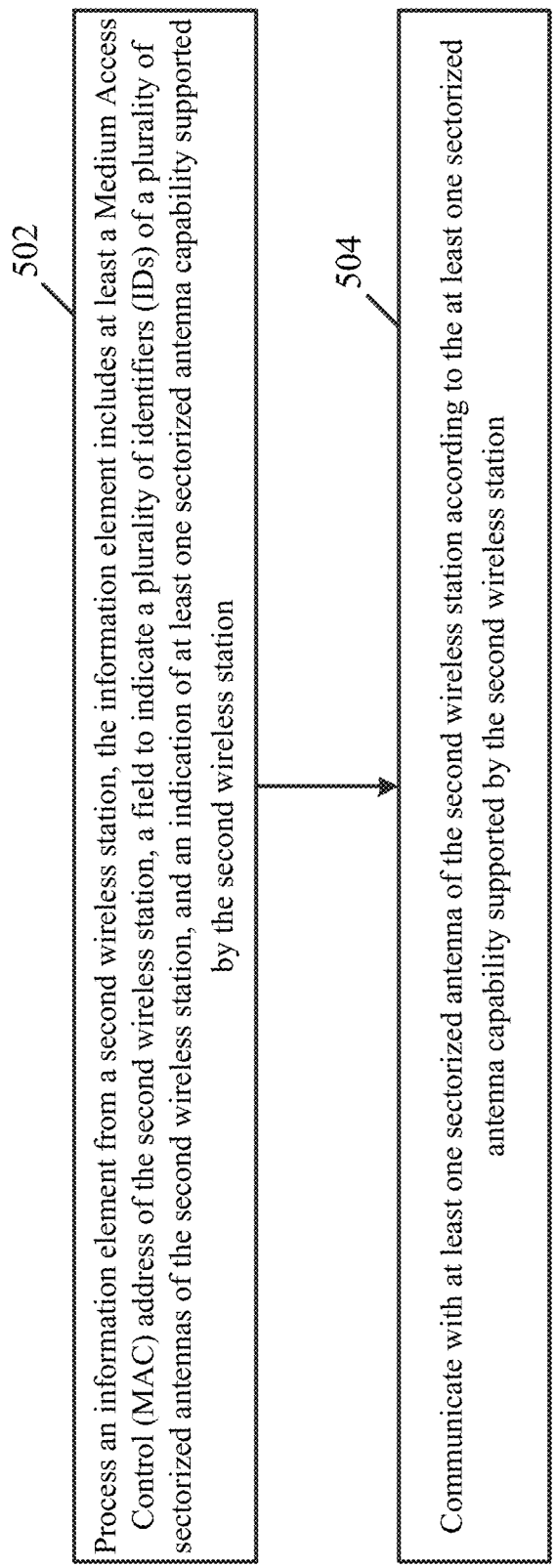
FIG. 5 is a schematic flow-chart illustration of a method of communicating with a wireless station having a plurality of sectorized antennas, in accordance with some demonstrative embodiments.

Reference is made to FIG. 5, which schematically illustrates a method of communicating with wireless station having a plurality of sectorized antennas, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1); and/or a wireless station, e.g., wireless station 226 (FIG. 2).

As indicated at block 502, the method may include processing at a first wireless station an information element from a second wireless station, the information element may include at least a MAC address of the second wireless station, a field to indicate a plurality of IDs of a plurality of sectorized antennas of the second wireless station, and an indication of at least one sectorized antenna capability supported by the second wireless station. For example, device 140 (FIG. 1) may process a sectorized antenna information element from an AP STA, e.g., wireless station 200 (FIG. 2). The information element may include, for example, the MAC address of the AP STA, a field to indicate the plurality of IDs of the plurality of sectorized antennas of the AP STA, and the indication of at least one sectorized antenna capability supported by the AP STA, e.g., as described above.

As indicated at block 504, the method may include communicating with at least one sectorized antenna of the second wireless station according to the at least one sectorized antenna capability supported by the second wireless station. For example, controller 154 (FIG. 1) may be configured to cause, trigger and/or control the wireless station implemented by device 140 (FIG. 1) to communicate with at least one sectorized antenna of the AP STA according to the at least one sectorized antenna capability supported by the AP STA, e.g., as described above.

Figure 6:
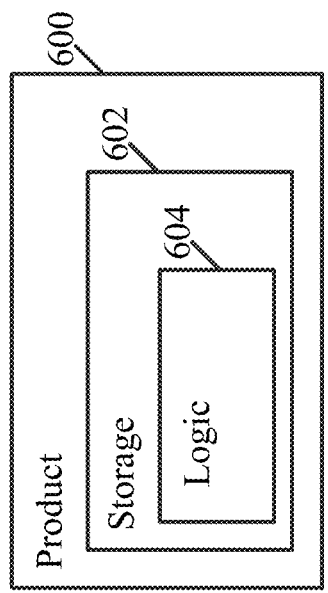
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), wireless station 200 (FIG. 200), wireless station 226 (FIG. 2), upper MAC component 210 (FIG. 2), lower MAC components 220, 230 and/or 240 (FIG. 2), lower PHY components 222, 232 and/or 242 (FIG. 2), and/or to perform, trigger and/or implement one or more operations, communications and/or functionalities as described above with reference to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, C#, Java, Python, BASIC, Matlab, Pascal, Visual BASIC, assembly language, machine code, and the like.

EXAMPLES

The following examples pertain to further embodiments.

Example 1 includes an apparatus comprising a plurality of Physical layer (PHY) components comprising circuitry to communicate via a respective plurality of sectorized antennas of a wireless station over a directional frequency band; a plurality of lower Medium Access Control (MAC) components, a lower MAC component of the plurality of lower MAC components configured to control channel access of the wireless station via a respective sectorized antenna of the plurality of sectorized antennas, and to process MAC Protocol Data Units (PDUs) to be communicated via the sectorized antenna; and an upper MAC component configured to cause the wireless station to transmit an information element via at least one sectorized antenna of the plurality of sectorized antennas, the information element comprising at least a MAC address of the wireless station, and a field to indicate a plurality of identifiers (IDs) of the plurality of sectorized antennas.

Example 2 includes the subject matter of Example 1, and optionally, wherein the upper MAC component is configured to coordinate unsynchronized communication via the plurality of sectorized antennas, the unsynchronized communication comprising transmission via at least one first sectorized antenna simultaneously with reception via at least one second sectorized antenna.

Example 3 includes the subject matter of Example 2, and optionally, wherein the unsynchronized communication comprises a Multi-User (MU) communication comprising transmission to at least one first user via the at least one first sectorized antenna, and reception from at least one second user via the at least one second sectorized antenna.

Example 4 includes the subject matter of Example 3, and optionally, wherein the unsynchronized communication comprises a MU Multiple-Input-Multiple-Output (MIMO) communication comprising beamformed transmission to the at least one first user via the at least one first sectorized antenna, and beamformed reception from the at least one second user via the at least one second sectorized antenna.

Example 5 includes the subject matter of any one of Examples 1-4, and optionally, wherein the upper MAC component is configured to cause the wireless station to transmit a frame comprising a MAC header comprising a MAC address field, the MAC address field comprising a combination of the MAC address of the wireless station and an ID of a sectorized antenna to transmit the frame.

Example 6 includes the subject matter of any one of Examples 1-4, and optionally, wherein the upper MAC component is configured to cause the wireless station to transmit a frame comprising a MAC header, the MAC header comprising a MAC address field comprising the MAC address of the wireless station, the frame comprising an antenna ID field comprising an ID of a sectorized antenna to transmit the frame.

Example 7 includes the subject matter of any one of Examples 1-6, and optionally, wherein the upper MAC component is configured to determine a first sectorized antenna ID based on a Transmit Address (TA) in a beamforming training frame from another station, and to cause the wireless station to selectively respond to the beamforming training frame based on a comparison between the first sectorized antenna ID and a second sectorized antenna ID of a sectorized antenna, via which the beamforming training frame is received.

Example 8 includes the subject matter of any one of Examples 1-7, and optionally, wherein the upper MAC component is configured to cause the wireless station to selectively respond to a beamforming training frame based on a comparison between a first sectorized antenna ID indicated in the beamforming training frame, and a second sectorized ID of a sectorized antenna, via which the beamforming training frame is received.

Example 9 includes the subject matter of any one of Examples 1-8, and optionally, wherein the field comprises a plurality of ID values.

Example 10 includes the subject matter of any one of Examples 1-9, and optionally, wherein the field comprises a total number of the plurality of sectorized antennas.

Example 11 includes the subject matter of any one of Examples 1-10, and optionally, wherein the upper MAC component is configured to cause the wireless station to transmit the information element in a beacon frame.

Example 12 includes the subject matter of any one of Examples 1-11, and optionally, wherein the upper MAC component is configured to cause the wireless station to transmit the information element in a beamforming training frame.

Example 13 includes the subject matter of any one of Examples 1-12, and optionally, wherein the information element comprises an indication of at least one sectorized antenna capability supported by the wireless station.

Example 14 includes the subject matter of Example 13, and optionally, wherein the at least one sectorized antenna capability comprises at least one capability selected from the group consisting of fast transition between sectorized antennas, interference coordination between sectorized antennas, and multi-sectorized-antenna communication.

Example 15 includes the subject matter of any one of Examples 1-14, and optionally, wherein the upper MAC component is configured to manage association between the wireless stations and one or more other wireless stations.

Example 16 includes the subject matter of any one of Examples 1-15, and optionally, wherein the wireless station comprises an Access Point (AP).

Example 17 includes the subject matter of any one of Examples 1-16, and optionally, comprising the plurality of sectorized antennas.

Example 18 includes the subject matter of any one of Examples 1-17, and optionally, comprising a memory and a processor.

Example 19 includes a system of wireless communication comprising a wireless station, the wireless station comprising a plurality of sectorized antennas; a memory; a processor; a plurality of Physical layer (PHY) components comprising circuitry to communicate via the plurality of sectorized antennas over a directional frequency band; a plurality of lower Medium Access Control (MAC) components, a lower MAC component of the plurality of lower MAC components configured to control channel access of the wireless station via a respective sectorized antenna of the plurality of sectorized antennas, and to process MAC Protocol Data Units (PDUs) to be communicated via the sectorized antenna; and an upper MAC component configured to cause the wireless station to transmit an information element via at least one sectorized antenna of the plurality of sectorized antennas, the information element comprising at least a MAC address of the wireless station, and a field to indicate a plurality of identifiers (IDs) of the plurality of sectorized antennas.

Example 20 includes the subject matter of Example 19, and optionally, wherein the upper MAC component is configured to coordinate unsynchronized communication via the plurality of sectorized antennas, the unsynchronized communication comprising transmission via at least one first sectorized antenna simultaneously with reception via at least one second sectorized antenna.

Example 21 includes the subject matter of Example 20, and optionally, wherein the unsynchronized communication comprises a Multi-User (MU) communication comprising transmission to at least one first user via the at least one first sectorized antenna, and reception from at least one second user via the at least one second sectorized antenna.

Example 22 includes the subject matter of Example 21, and optionally, wherein the unsynchronized communication comprises a MU Multiple-Input-Multiple-Output (MIMO) communication comprising beamformed transmission to the at least one first user via the at least one first sectorized antenna, and beamformed reception from the at least one second user via the at least one second sectorized antenna.

Example 23 includes the subject matter of any one of Examples 19-22, and optionally, wherein the upper MAC component is configured to cause the wireless station to transmit a frame comprising a MAC header comprising a MAC address field, the MAC address field comprising a combination of the MAC address of the wireless station and an ID of a sectorized antenna to transmit the frame.

Example 24 includes the subject matter of any one of Examples 19-22, and optionally, wherein the upper MAC component is configured to cause the wireless station to transmit a frame comprising a MAC header, the MAC header comprising a MAC address field comprising the MAC address of the wireless station, the frame comprising an antenna ID field comprising an ID of a sectorized antenna to transmit the frame.

Example 25 includes the subject matter of any one of Examples 19-24, and optionally, wherein the upper MAC component is configured to determine a first sectorized antenna ID based on a Transmit Address (TA) in a beamforming training frame from another station, and to cause the wireless station to selectively respond to the beamforming training frame based on a comparison between the first sectorized antenna ID and a second sectorized antenna ID of a sectorized antenna, via which the beamforming training frame is received.

Example 26 includes the subject matter of any one of Examples 19-25, and optionally, wherein the upper MAC component is configured to cause the wireless station to selectively respond to a beamforming training frame based on a comparison between a first sectorized antenna ID indicated in the beamforming training frame, and a second sectorized ID of a sectorized antenna, via which the beamforming training frame is received.

Example 27 includes the subject matter of any one of Examples 19-26, and optionally, wherein the field comprises a plurality of ID values.

Example 28 includes the subject matter of any one of Examples 19-27, and optionally, wherein the field comprises a total number of the plurality of sectorized antennas.

Example 29 includes the subject matter of any one of Examples 19-28, and optionally, wherein the upper MAC component is configured to cause the wireless station to transmit the information element in a beacon frame.

Example 30 includes the subject matter of any one of Examples 19-29, and optionally, wherein the upper MAC component is configured to cause the wireless station to transmit the information element in a beamforming training frame.

Example 31 includes the subject matter of any one of Examples 19-30, and optionally, wherein the information element comprises an indication of at least one sectorized antenna capability supported by the wireless station.

Example 32 includes the subject matter of Example 31, and optionally, wherein the at least one sectorized antenna capability comprises at least one capability selected from the group consisting of fast transition between sectorized antennas, interference coordination between sectorized antennas, and multi-sectorized-antenna communication.

Example 33 includes the subject matter of any one of Examples 19-32, and optionally, wherein the upper MAC component is configured to manage association between the wireless stations and one or more other wireless stations.

Example 34 includes the subject matter of any one of Examples 19-33, and optionally, wherein the wireless station comprises an Access Point (AP).

Example 35 includes a method to be performed at a wireless station, the method comprising operating a plurality of Physical layer (PHY) components to communicate via a respective plurality of sectorized antennas of the wireless station over a directional frequency band; operating a plurality of lower Medium Access Control (MAC) components by causing a lower MAC component of the plurality of lower MAC components to control channel access of the wireless station via a respective sectorized antenna of the plurality of sectorized antennas, and to process MAC Protocol Data Units (PDUs) to be communicated via the sectorized antenna; and transmitting an information element via at least one sectorized antenna of the plurality of sectorized antennas, the information element comprising at least a MAC address of the wireless station, and a field to indicate a plurality of identifiers (IDs) of the plurality of sectorized antennas.

Example 36 includes the subject matter of Example 35, and optionally, comprising coordinating unsynchronized communication via the plurality of sectorized antennas, the unsynchronized communication comprising transmission via at least one first sectorized antenna simultaneously with reception via at least one second sectorized antenna.

Example 37 includes the subject matter of Example 36, and optionally, wherein the unsynchronized communication comprises a Multi-User (MU) communication comprising transmission to at least one first user via the at least one first sectorized antenna, and reception from at least one second user via the at least one second sectorized antenna.

Example 38 includes the subject matter of Example 37, and optionally, wherein the unsynchronized communication comprises a MU Multiple-Input-Multiple-Output (MIMO) communication comprising beamformed transmission to the at least one first user via the at least one first sectorized antenna, and beamformed reception from the at least one second user via the at least one second sectorized antenna.

Example 39 includes the subject matter of any one of Examples 35-38, and optionally, comprising transmitting a frame comprising a MAC header comprising a MAC address field, the MAC address field comprising a combination of the MAC address of the wireless station and an ID of a sectorized antenna to transmit the frame.

Example 40 includes the subject matter of any one of Examples 35-38, and optionally, comprising transmitting a frame comprising a MAC header, the MAC header comprising a MAC address field comprising the MAC address of the wireless station, the frame comprising an antenna ID field comprising an ID of a sectorized antenna to transmit the frame.

Example 41 includes the subject matter of any one of Examples 35-40, and optionally, comprising determining a first sectorized antenna ID based on a Transmit Address (TA) in a beamforming training frame from another station, and selectively responding to the beamforming training frame based on a comparison between the first sectorized antenna ID and a second sectorized antenna ID of a sectorized antenna, via which the beamforming training frame is received.

Example 42 includes the subject matter of any one of Examples 35-41, and optionally, comprising selectively responding to a beamforming training frame based on a comparison between a first sectorized antenna ID indicated in the beamforming training frame, and a second sectorized ID of a sectorized antenna, via which the beamforming training frame is received.

Example 43 includes the subject matter of any one of Examples 35-42, and optionally, wherein the field comprises a plurality of ID values.

Example 44 includes the subject matter of any one of Examples 35-43, and optionally, wherein the field comprises a total number of the plurality of sectorized antennas.

Example 45 includes the subject matter of any one of Examples 35-44, and optionally, comprising transmitting the information element in a beacon frame.

Example 46 includes the subject matter of any one of Examples 35-45, and optionally, comprising transmitting the information element in a beamforming training frame.

Example 47 includes the subject matter of any one of Examples 35-46, and optionally, wherein the information element comprises an indication of at least one sectorized antenna capability supported by the wireless station.

Example 48 includes the subject matter of Example 47, and optionally, wherein the at least one sectorized antenna capability comprises at least one capability selected from the group consisting of fast transition between sectorized antennas, interference coordination between sectorized antennas, and multi-sectorized-antenna communication.

Example 49 includes the subject matter of any one of Examples 35-48, and optionally, comprising managing association between the wireless stations and one or more other wireless stations.

Example 50 includes the subject matter of any one of Examples 35-49, and optionally, wherein the wireless station comprises an Access Point (AP).

Example 51 includes a product including one or more tangible computer-readable non-transitory storage media comprising computer-executable instructions operable to, when executed by at least one computer processor, enable the at least one computer processor to implement operations at a wireless station, the operations comprising operating a plurality of Physical layer (PHY) components to communicate via a respective plurality of sectorized antennas of the wireless station over a directional frequency band; operating a plurality of lower Medium Access Control (MAC) components by causing a lower MAC component of the plurality of lower MAC components to control channel access of the wireless station via a respective sectorized antenna of the plurality of sectorized antennas, and to process MAC Protocol Data Units (PDUs) to be communicated via the sectorized antenna; and transmitting an information element via at least one sectorized antenna of the plurality of sectorized antennas, the information element comprising at least a MAC address of the wireless station, and a field to indicate a plurality of identifiers (IDs) of the plurality of sectorized antennas.

Example 52 includes the subject matter of Example 51, and optionally, wherein the operations comprise coordinating unsynchronized communication via the plurality of sectorized antennas, the unsynchronized communication comprising transmission via at least one first sectorized antenna simultaneously with reception via at least one second sectorized antenna.

Example 53 includes the subject matter of Example 52, and optionally, wherein the unsynchronized communication comprises a Multi-User (MU) communication comprising transmission to at least one first user via the at least one first sectorized antenna, and reception from at least one second user via the at least one second sectorized antenna.

Example 54 includes the subject matter of Example 53, and optionally, wherein the unsynchronized communication comprises a MU Multiple-Input-Multiple-Output (MIMO) communication comprising beamformed transmission to the at least one first user via the at least one first sectorized antenna, and beamformed reception from the at least one second user via the at least one second sectorized antenna.

Example 55 includes the subject matter of any one of Examples 51-54, and optionally, wherein the operations comprise transmitting a frame comprising a MAC header comprising a MAC address field, the MAC address field comprising a combination of the MAC address of the wireless station and an ID of a sectorized antenna to transmit the frame.

Example 56 includes the subject matter of any one of Examples 51-54, and optionally, wherein the operations comprise transmitting a frame comprising a MAC header, the MAC header comprising a MAC address field comprising the MAC address of the wireless station, the frame comprising an antenna ID field comprising an ID of a sectorized antenna to transmit the frame.

Example 57 includes the subject matter of any one of Examples 51-56, and optionally, wherein the operations comprise determining a first sectorized antenna ID based on a Transmit Address (TA) in a beamforming training frame from another station, and selectively responding to the beamforming training frame based on a comparison between the first sectorized antenna ID and a second sectorized antenna ID of a sectorized antenna, via which the beamforming training frame is received.

Example 58 includes the subject matter of any one of Examples 51-57, and optionally, wherein the operations comprise selectively responding to a beamforming training frame based on a comparison between a first sectorized antenna ID indicated in the beamforming training frame, and a second sectorized ID of a sectorized antenna, via which the beamforming training frame is received.

Example 59 includes the subject matter of any one of Examples 51-58, and optionally, wherein the field comprises a plurality of ID values.

Example 60 includes the subject matter of any one of Examples 51-59, and optionally, wherein the field comprises a total number of the plurality of sectorized antennas.

Example 61 includes the subject matter of any one of Examples 51-60, and optionally, wherein the operations comprise transmitting the information element in a beacon frame.

Example 62 includes the subject matter of any one of Examples 51-61, and optionally, wherein the operations comprise transmitting the information element in a beamforming training frame.

Example 63 includes the subject matter of any one of Examples 51-62, and optionally, wherein the information element comprises an indication of at least one sectorized antenna capability supported by the wireless station.

Example 64 includes the subject matter of Example 63, and optionally, wherein the at least one sectorized antenna capability comprises at least one capability selected from the group consisting of fast transition between sectorized antennas, interference coordination between sectorized antennas, and multi-sectorized-antenna communication.

Example 65 includes the subject matter of any one of Examples 51-64, and optionally, wherein the operations comprise managing association between the wireless stations and one or more other wireless stations.

Example 66 includes the subject matter of any one of Examples 51-65, and optionally, wherein the wireless station comprises an Access Point (AP).

Example 67 includes an apparatus of wireless communication by a wireless station, the apparatus comprising means for operating a plurality of Physical layer (PHY) components to communicate via a respective plurality of sectorized antennas of the wireless station over a directional frequency band; means for operating a plurality of lower Medium Access Control (MAC) components by causing a lower MAC component of the plurality of lower MAC components to control channel access of the wireless station via a respective sectorized antenna of the plurality of sectorized antennas, and to process MAC Protocol Data Units (PDUs) to be communicated via the sectorized antenna; and means for transmitting an information element via at least one sectorized antenna of the plurality of sectorized antennas, the information element comprising at least a MAC address of the wireless station, and a field to indicate a plurality of identifiers (IDs) of the plurality of sectorized antennas.

Example 68 includes the subject matter of Example 67, and optionally, comprising means for coordinating unsynchronized communication via the plurality of sectorized antennas, the unsynchronized communication comprising transmission via at least one first sectorized antenna simultaneously with reception via at least one second sectorized antenna.

Example 69 includes the subject matter of Example 68, and optionally, wherein the unsynchronized communication comprises a Multi-User (MU) communication comprising transmission to at least one first user via the at least one first sectorized antenna, and reception from at least one second user via the at least one second sectorized antenna.

Example 70 includes the subject matter of Example 69, and optionally, wherein the unsynchronized communication comprises a MU Multiple-Input-Multiple-Output (MIMO) communication comprising beamformed transmission to the at least one first user via the at least one first sectorized antenna, and beamformed reception from the at least one second user via the at least one second sectorized antenna.

Example 71 includes the subject matter of any one of Examples 67-70, and optionally, comprising means for transmitting a frame comprising a MAC header comprising a MAC address field, the MAC address field comprising a combination of the MAC address of the wireless station and an ID of a sectorized antenna to transmit the frame.

Example 72 includes the subject matter of any one of Examples 67-70, and optionally, comprising means for transmitting a frame comprising a MAC header, the MAC header comprising a MAC address field comprising the MAC address of the wireless station, the frame comprising an antenna ID field comprising an ID of a sectorized antenna to transmit the frame.

Example 73 includes the subject matter of any one of Examples 67-72, and optionally, comprising means for determining a first sectorized antenna ID based on a Transmit Address (TA) in a beamforming training frame from another station, and selectively responding to the beamforming training frame based on a comparison between the first sectorized antenna ID and a second sectorized antenna ID of a sectorized antenna, via which the beamforming training frame is received.

Example 74 includes the subject matter of any one of Examples 67-73, and optionally, comprising means for selectively responding to a beamforming training frame based on a comparison between a first sectorized antenna ID indicated in the beamforming training frame, and a second sectorized ID of a sectorized antenna, via which the beamforming training frame is received.

Example 75 includes the subject matter of any one of Examples 67-74, and optionally, wherein the field comprises a plurality of ID values.

Example 76 includes the subject matter of any one of Examples 67-75, and optionally, wherein the field comprises a total number of the plurality of sectorized antennas.

Example 77 includes the subject matter of any one of Examples 67-76, and optionally, comprising means for transmitting the information element in a beacon frame.

Example 78 includes the subject matter of any one of Examples 67-77, and optionally, comprising means for transmitting the information element in a beamforming training frame.

Example 79 includes the subject matter of any one of Examples 67-78, and optionally, wherein the information element comprises an indication of at least one sectorized antenna capability supported by the wireless station.

Example 80 includes the subject matter of Example 79, and optionally, wherein the at least one sectorized antenna capability comprises at least one capability selected from the group consisting of fast transition between sectorized antennas, interference coordination between sectorized antennas, and multi-sectorized-antenna communication.

Example 81 includes the subject matter of any one of Examples 67-80, and optionally, comprising means for managing association between the wireless stations and one or more other wireless stations.

Example 82 includes the subject matter of any one of Examples 67-81, and optionally, wherein the wireless station comprises an Access Point (AP).

Example 83 includes an apparatus comprising circuitry and logic configured to cause a first wireless station to process an information element from a second wireless station, the information element comprising at least a Medium Access Control (MAC) address of the second wireless station, a field to indicate a plurality of identifiers (IDs) of a plurality of sectorized antennas of the second wireless station, and an indication of at least one sectorized antenna capability supported by the second wireless station; and communicate with at least one sectorized antenna of the second wireless station according to the at least one sectorized antenna capability supported by the second wireless station.

Example 84 includes the subject matter of Example 83, and optionally, wherein the at least one sectorized antenna capability comprises at least one capability selected from the group consisting of fast transition between sectorized antennas, interference coordination between sectorized antennas, and multi-sectorized-antenna communication.

Example 85 includes the subject matter of Example 83 or 84, and optionally, wherein the apparatus is configured to cause the first wireless station to process a frame from the sectorized antenna of the second wireless station, the frame comprising a MAC header comprising a MAC address field, the MAC address field comprising a combination of the MAC address of the second wireless station and an ID of the sectorized antenna.

Example 86 includes the subject matter of Example 83 or 84, and optionally, wherein the apparatus is configured to cause the first wireless station to process a frame from the sectorized antenna of the second wireless station, the frame comprising a MAC header, the MAC header comprising a MAC address field comprising the MAC address of the second wireless station, the frame comprising an antenna ID field comprising an ID of the sectorized antenna.

Example 87 includes the subject matter of any one of Examples 83-86, and optionally, wherein the apparatus is configured to cause the first wireless station to transmit a beamforming training frame to perform beamforming training with the sectorized antenna of the second wireless station, the beamforming frame comprising an ID of the sectorized antenna.

Example 88 includes the subject matter of any one of Examples 83-87, and optionally, wherein the field comprises a plurality of ID values.

Example 89 includes the subject matter of any one of Examples 83-88, and optionally, wherein the field comprises a total number of the plurality of sectorized antennas, the apparatus to cause the first wireless station to determine the plurality of IDs based on the total number of the plurality of sectorized antennas.

Example 90 includes the subject matter of any one of Examples 83-89, and optionally, wherein the apparatus is configured to cause the first wireless station to process a beacon frame comprising the information element.

Example 91 includes the subject matter of any one of Examples 83-90, and optionally, wherein the apparatus is configured to cause the first wireless station to process a beamforming training frame comprising the information element.

Example 92 includes the subject matter of any one of Examples 83-91, and optionally, wherein the second wireless station comprises an Access Point (AP).

Example 93 includes the subject matter of any one of Examples 83-92, and optionally, comprising one or more antennas, a memory and a processor.

Example 94 includes a system of wireless communication comprising a first wireless station, the first wireless station comprising one or more antennas; a memory; a processor; and a controller configured to cause the wireless station to process an information element from a second wireless station, the information element comprising at least a Medium Access Control (MAC) address of the second wireless station, a field to indicate a plurality of identifiers (IDs) of a plurality of sectorized antennas of the second wireless station, and an indication of at least one sectorized antenna capability supported by the second wireless station; and communicate with at least one sectorized antenna of the second wireless station according to the at least one sectorized antenna capability supported by the second wireless station.

Example 95 includes the subject matter of Example 94, and optionally, wherein the at least one sectorized antenna capability comprises at least one capability selected from the group consisting of fast transition between sectorized antennas, interference coordination between sectorized antennas, and multi-sectorized-antenna communication.

Example 96 includes the subject matter of Example 94 or 95, and optionally, wherein the controller is configured to cause the first wireless station to process a frame from the sectorized antenna of the second wireless station, the frame comprising a MAC header comprising a MAC address field, the MAC address field comprising a combination of the MAC address of the second wireless station and an ID of the sectorized antenna.

Example 97 includes the subject matter of Example 94 or 95, and optionally, wherein the controller is configured to cause the first wireless station to process a frame from the sectorized antenna of the second wireless station, the frame comprising a MAC header, the MAC header comprising a MAC address field comprising the MAC address of the second wireless station, the frame comprising an antenna ID field comprising an ID of the sectorized antenna.

Example 98 includes the subject matter of any one of Examples 94-97, and optionally, wherein the controller is configured to cause the first wireless station to transmit a beamforming training frame to perform beamforming training with the sectorized antenna of the second wireless station, the beamforming frame comprising an ID of the sectorized antenna.

Example 99 includes the subject matter of any one of Examples 94-98, and optionally, wherein the field comprises a plurality of ID values.

Example 100 includes the subject matter of any one of Examples 94-99, and optionally, wherein the field comprises a total number of the plurality of sectorized antennas, the controller is configured to cause the first wireless station to determine the plurality of IDs based on the total number of the plurality of sectorized antennas.

Example 101 includes the subject matter of any one of Examples 94-100, and optionally, wherein the controller is configured to cause the first wireless station to process a beacon frame comprising the information element.

Example 102 includes the subject matter of any one of Examples 94-101, and optionally, wherein the controller is configured to cause the first wireless station to process a beamforming training frame comprising the information element.

Example 103 includes the subject matter of any one of Examples 94-102, and optionally, wherein the second wireless station comprises an Access Point (AP).

Example 104 includes a method to be performed at a first wireless station, the method comprising processing an information element from a second wireless station, the information element comprising at least a Medium Access Control (MAC) address of the second wireless station, a field to indicate a plurality of identifiers (IDs) of a plurality of sectorized antennas of the second wireless station, and an indication of at least one sectorized antenna capability supported by the second wireless station; and communicating with at least one sectorized antenna of the second wireless station according to the at least one sectorized antenna capability supported by the second wireless station.

Example 105 includes the subject matter of Example 104, and optionally, wherein the at least one sectorized antenna capability comprises at least one capability selected from the group consisting of fast transition between sectorized antennas, interference coordination between sectorized antennas, and multi-sectorized-antenna communication.

Example 106 includes the subject matter of Example 104 or 105, and optionally, comprising processing a frame from the sectorized antenna of the second wireless station, the frame comprising a MAC header comprising a MAC address field, the MAC address field comprising a combination of the MAC address of the second wireless station and an ID of the sectorized antenna.

Example 107 includes the subject matter of Example 104 or 105, and optionally, comprising processing a frame from the sectorized antenna of the second wireless station, the frame comprising a MAC header, the MAC header comprising a MAC address field comprising the MAC address of the second wireless station, the frame comprising an antenna ID field comprising an ID of the sectorized antenna.

Example 108 includes the subject matter of any one of Examples 104-107, and optionally, comprising transmitting a beamforming training frame to perform beamforming training with the sectorized antenna of the second wireless station, the beamforming frame comprising an ID of the sectorized antenna.

Example 109 includes the subject matter of any one of Examples 104-108, and optionally, wherein the field comprises a plurality of ID values.

Example 110 includes the subject matter of any one of Examples 104-109, and optionally, wherein the field comprises a total number of the plurality of sectorized antennas, comprising determining the plurality of IDs based on the total number of the plurality of sectorized antennas.

Example 111 includes the subject matter of any one of Examples 104-110, and optionally, comprising processing a beacon frame comprising the information element.

Example 112 includes the subject matter of any one of Examples 104-111, and optionally, comprising processing a beamforming training frame comprising the information element.

Example 113 includes the subject matter of any one of Examples 104-112, and optionally, wherein the second wireless station comprises an Access Point (AP).

Example 114 includes a product including one or more tangible computer-readable non-transitory storage media comprising computer-executable instructions operable to, when executed by at least one computer processor, enable the at least one computer processor to implement operations at a first wireless station, the operations comprising processing an information element from a second wireless station, the information element comprising at least a Medium Access Control (MAC) address of the second wireless station, a field to indicate a plurality of identifiers (IDs) of a plurality of sectorized antennas of the second wireless station, and an indication of at least one sectorized antenna capability supported by the second wireless station; and communicating with at least one sectorized antenna of the second wireless station according to the at least one sectorized antenna capability supported by the second wireless station.

Example 115 includes the subject matter of Example 114, and optionally, wherein the at least one sectorized antenna capability comprises at least one capability selected from the group consisting of fast transition between sectorized antennas, interference coordination between sectorized antennas, and multi-sectorized-antenna communication.

Example 116 includes the subject matter of Example 114 or 115, and optionally, wherein the operations comprise processing a frame from the sectorized antenna of the second wireless station, the frame comprising a MAC header comprising a MAC address field, the MAC address field comprising a combination of the MAC address of the second wireless station and an ID of the sectorized antenna.

Example 117 includes the subject matter of Example 114 or 115, and optionally, wherein the operations comprise processing a frame from the sectorized antenna of the second wireless station, the frame comprising a MAC header, the MAC header comprising a MAC address field comprising the MAC address of the second wireless station, the frame comprising an antenna ID field comprising an ID of the sectorized antenna.

Example 118 includes the subject matter of any one of Examples 114-117, and optionally, wherein the operations comprise transmitting a beamforming training frame to perform beamforming training with the sectorized antenna of the second wireless station, the beamforming frame comprising an ID of the sectorized antenna.

Example 119 includes the subject matter of any one of Examples 114-118, and optionally, wherein the field comprises a plurality of ID values.

Example 120 includes the subject matter of any one of Examples 114-119, and optionally, wherein the field comprises a total number of the plurality of sectorized antennas, the operations comprising determining the plurality of IDs based on the total number of the plurality of sectorized antennas.

Example 121 includes the subject matter of any one of Examples 114-120, and optionally, wherein the operations comprise processing a beacon frame comprising the information element.

Example 122 includes the subject matter of any one of Examples 114-121, and optionally, wherein the operations comprise processing a beamforming training frame comprising the information element.

Example 123 includes the subject matter of any one of Examples 114-122, and optionally, wherein the second wireless station comprises an Access Point (AP).

Example 124 includes an apparatus of wireless communication by a first wireless station, the apparatus comprising means for processing an information element from a second wireless station, the information element comprising at least a Medium Access Control (MAC) address of the second wireless station, a field to indicate a plurality of identifiers (IDs) of a plurality of sectorized antennas of the second wireless station, and an indication of at least one sectorized antenna capability supported by the second wireless station; and means for communicating with at least one sectorized antenna of the second wireless station according to the at least one sectorized antenna capability supported by the second wireless station.

Example 125 includes the subject matter of Example 124, and optionally, wherein the at least one sectorized antenna capability comprises at least one capability selected from the group consisting of fast transition between sectorized antennas, interference coordination between sectorized antennas, and multi-sectorized-antenna communication.

Example 126 includes the subject matter of Example 124 or 125, and optionally, comprising means for processing a frame from the sectorized antenna of the second wireless station, the frame comprising a MAC header comprising a MAC address field, the MAC address field comprising a combination of the MAC address of the second wireless station and an ID of the sectorized antenna.

Example 127 includes the subject matter of Example 124 or 125, and optionally, comprising means for processing a frame from the sectorized antenna of the second wireless station, the frame comprising a MAC header, the MAC header comprising a MAC address field comprising the MAC address of the second wireless station, the frame comprising an antenna ID field comprising an ID of the sectorized antenna.

Example 128 includes the subject matter of any one of Examples 124-127, and optionally, comprising means for transmitting a beamforming training frame to perform beamforming training with the sectorized antenna of the second wireless station, the beamforming frame comprising an ID of the sectorized antenna.

Example 129 includes the subject matter of any one of Examples 124-128, and optionally, wherein the field comprises a plurality of ID values.

Example 130 includes the subject matter of any one of Examples 124-129, and optionally, wherein the field comprises a total number of the plurality of sectorized antennas, the apparatus comprising means for determining the plurality of IDs based on the total number of the plurality of sectorized antennas.

Example 131 includes the subject matter of any one of Examples 124-130, and optionally, comprising means for processing a beacon frame comprising the information element.

Example 132 includes the subject matter of any one of Examples 124-131, and optionally, comprising means for processing a beamforming training frame comprising the information element.

Example 133 includes the subject matter of any one of Examples 124-132, and optionally, wherein the second wireless station comprises an Access Point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a plurality of Physical layer (PHY) components comprising logic and circuitry configured to communicate over a frequency band above 45 Gigahertz (GHz) via a plurality of sectorized antennas of a wireless communication device, the plurality of PHY components comprising at least a first PHY component to communicate via a first sectorized antenna of the plurality of sectorized antennas and a second PHY component to communicate via a second sectorized antenna of the plurality of sectorized antennas;
a plurality of Medium Access Control (MAC) components, the plurality of MAC components comprising at least a first MAC component and a second MAC component, the first MAC component comprising logic and circuitry configured to control channel access via the first sectorized antenna and to process MAC Protocol Data Units (MPDUs) to be communicated via the first sectorized antenna, the second MAC component comprising logic and circuitry configured to control channel access via the second sectorized antenna and to process MPDUs to be communicated via the second sectorized antenna; and
a MAC management component comprising logic and circuitry configured to manage communication via the plurality of sectorized antennas, the MAC management component configured to coordinate a synchronized transmission via the plurality of sectorized antennas.

2. The apparatus of claim 1, wherein the MAC management component is configured to coordinate a Multiple-Input-Multiple-Output (MIMO) transmission via the plurality of sectorized antennas.

3. The apparatus of claim 2, wherein the MIMO transmission comprises a Multi-User (MU) MIMO transmission.

4. The apparatus of claim 2, wherein the MIMO transmission comprises a Single-User (SU) MIMO transmission.

5. The apparatus of claim 1, wherein the first MAC component is to process a first transmission to one or more first stations (STAs) via the first sectorized antenna, and the second MAC component is to process a second transmission to one or more second STAs via the second sectorized antenna.

6. The apparatus of claim 1, wherein the first and second sectorized antennas have an overlapping coverage.

7. The apparatus of claim 1, wherein the first and second sectorized antennas have a non-overlapping coverage.

8. The apparatus of claim 1, wherein the first PHY component is configured to communicate via a first Directional Multi Gigabit (DMG) antenna of the plurality of sectorized antennas over a DMG frequency band, and the second PHY component is configured to communicate via a second DMG antenna of the plurality of sectorized antennas over the DMG frequency band.

9. The apparatus of claim 1 comprising the plurality of sectorized antennas.

10. The apparatus of claim 1 comprising a memory and a processor.

11. A product comprising one or more tangible computer-readable non-transitory storage media comprising computer-executable instructions operable to, when executed by at least one processor, enable the at least one processor to cause a wireless communication device to:
operate a plurality of Physical layer (PHY) components to communicate over a frequency band above 45 Gigahertz (GHz) via a plurality of sectorized antennas of the wireless communication device, operating the plurality of PHY components comprises operating at least a first PHY component to communicate via a first sectorized antenna of the plurality of sectorized antennas and a second PHY component to communicate via a second sectorized antenna of the plurality of sectorized antennas;
operate a plurality of Medium Access Control (MAC) components comprising at least a first MAC component and a second MAC component by operating the first MAC component to control channel access via the first sectorized antenna and to process MAC Protocol Data Units (MPDUs) to be communicated via the first sectorized antenna, and operating the second MAC component to control channel access via the second sectorized antenna and to process MPDUs to be communicated via the second sectorized antenna; and
operate a MAC management component to manage communication via the plurality of sectorized antennas, the instructions, when executed, cause the MAC management component to coordinate a synchronized transmission via the plurality of sectorized antennas.

12. The product of claim 11, wherein the instructions, when executed, cause the MAC management component to coordinate a Multiple-Input-Multiple-Output (MIMO) transmission via the plurality of sectorized antennas.

13. The product of claim 12 wherein the MIMO transmission comprises a Single-User (SU) MIMO transmission.

14. The product of claim 12, wherein the MIMO transmission comprises a Multi-User (MU) MIMO transmission.

15. The product of claim 11, wherein the instructions, when executed, cause the first MAC component to process a first transmission to one or more first stations (STAs) via the first sectorized antenna, and the second MAC component to process a second transmission to one or more second STAs via the second sectorized antenna.

16. The product of claim 11, wherein the instructions, when executed, cause the first PHY component to communicate via a first Directional Multi Gigabit (DMG) antenna of the plurality of sectorized antennas over a DMG frequency band, and the second PHY component to communicate via a second DMG antenna of the plurality of sectorized antennas over the DMG frequency band.

17. An apparatus for a wireless communication device, the apparatus comprising:
means for operating a plurality of Physical layer (PHY) components to communicate over a frequency band above 45 Gigahertz (GHz) via a plurality of sectorized antennas of the wireless communication device, operating the plurality of PHY components comprises operating at least a first PHY component to communicate via a first sectorized antenna of the plurality of sectorized antennas and a second PHY component to communicate via a second sectorized antenna of the plurality of sectorized antennas;

means for operating a plurality of Medium Access Control (MAC) components comprising at least a first MAC component and a second MAC component by operating the first MAC component to control channel access via the first sectorized antenna and to process MAC Protocol Data Units (MPDUs) to be communicated via the first sectorized antenna, and operating the second MAC component to control channel access via the second sectorized antenna and to process MPDUs to be communicated via the second sectorized antenna; and means for operating a MAC management component to manage communication via the plurality of sectorized antennas, the means for operating the MAC management component comprising means for coordinating a synchronized transmission via the plurality of sectorized antennas.

18. The apparatus of claim 17 comprising means for causing the MAC management component to coordinate a Multiple-Input-Multiple-Output (MIMO) transmission via the plurality of sectorized antennas.

19. The apparatus of claim 17 comprising means for causing the first PHY component to communicate via a first Directional Multi Gigabit (DMG) antenna of the plurality of sectorized antennas over a DMG frequency band, and the second PHY component to communicate via a second DMG antenna of the plurality of sectorized antennas over the DMG frequency band.

* * * * *